United States Patent [19]

Shah

[11] Patent Number: 4,836,098
[45] Date of Patent: Jun. 6, 1989

[54] METHOD AND APPARATUS FOR COOKING AND PACKING FOOD IN GLASS CONTAINERS

[76] Inventor: Jagdish C. Shah, 126 Mill Spring Ln., Stamford, Conn. 06903

[21] Appl. No.: 244,604

[22] Filed: Sep. 14, 1988

Related U.S. Application Data

[63] Continuation of Ser. No. 906,477, Sep. 12, 1986, abandoned.

[51] Int. Cl.[4] ............................................... A23L 3/00
[52] U.S. Cl. .................................... 99/360; 99/443 C
[58] Field of Search ............ 99/360, 361, 362, 443 C, 99/356, 367, 368; 141/82, 97, 37

[56] References Cited

U.S. PATENT DOCUMENTS 3,692,534  9/1972  Ueno et al. .......................... 99/90 P
3,886,296  5/1975  Brooks et al. ........................ 426/325
4,262,027  4/1981  Tonner et al. ....................... 426/325
4,338,911  7/1982  Smith ................................. 99/443 C

OTHER PUBLICATIONS

Wolverine Corp. Articles: Jetzone ® Fluidized Bed Furnace.
The Only Fluidized Bed Machine of Its Type.
Energy Conservation for Particulates Processing.
Dryers & Ovens.
Type SB Jetzone ® Fluidized Belt Processor.
Type SR Jetzone ® Cooler.
Jetzone ® Laboratory Batch Unit.
Jetzone ® For Chemical and Processing Applications.
The Jetzone Snack Processor.
The Jetzone Cereal Processor.
New Technology Processing.
Jetzone ® The Original Patented Air Impingement Processor.
Heat and Control, Inc.—Higher Yield Lower Cost.
Heat and Control, Inc.—Model BPF Breaded Products Fryer.
Heat and Control, Inc.—Dallas Meat Processor Builds Ultra-Modern Plant.
Counterflow Oven—Stein Associates, Inc.
Gas Infrared Food Broilers—Fostoria Industries, Inc.
Electric Food Broilers—Fostoria Industries, Inc.
Fostoria Infrared Broilers-Ovens.

Primary Examiner—Linda J. Sholl
Attorney, Agent, or Firm—Melvin H. Kurtz

[57] ABSTRACT

Method and apparatus for the controlled cooking of food solids in glass containers while overcoming the problem of thermal shattering of the glass is disclosed. By using a tunnel furnace with heated air directed into and around the glass container, the glass can be tempered and retempered according to the needs of the ingredients to be added. Foods such as meat can be cooked in the glass container without loss of beneficial by-products. By using this method and apparatus, solid foods can be added separately from liquid foods to thereby control amount of material packed. This procedure also allows for the frozen addition of the solids to thereby avoid disintegration of the solid if soft and subject to abrasion.

6 Claims, 4 Drawing Sheets

METHOD AND APPARATUS FOR COOKING AND PACKING FOOD IN GLASS CONTAINERS

This is a continuation of application Ser. No. 906,477, filed Sep. 12, 1986, now abandoned.

The present invention relates to a method and apparatus for heat treating material in containers, such as cooking and packaging foods in glass containers while reducing the chance of container breakage due to thermal shock.

BACKGROUND OF THE INVENTION

Presently, a wide variety of foods are canned and pasteurized to prevent microbial spoilage by heating the canned product under high pressure, i.e., in a retort, for a period of time and at a temperature sufficient to render the product commercially sterile. However, the time and temperature needed for commercial sterility generally results in overcooking of the food.

As an example, in retort processing of an Italian pasta, meat balls and sauce product, meat is formed into meat balls by extrusion, browned and added in appropriate numbers to cans. Pasta is extruded, blanched and similarly added to the cans. After adding sauce, the cans are sealed and heated in a retort to effect cooking of the ingredients as well as pasteurization. The pasta is generally overcooked, soft and undesirable.

An alternate system of pasteurization has been developed which relies upon the inability of certain harmful organisms to be viable under reduced pH. The processing of foods under acidic conditions of an equilibrium pH of 4.6 and below requires a lesser period of heating at a lower temperature than that used for retort canning to thereby avoid the loss of organoleptic properties due to excessive cooking. While this method avoids excessive cooking, it also requires that each ingredient be cooked prior to pasteurization.

It is desirable to cook the meat balls in the sauce to avoid loss of flavoring components from the meat. However, the small meat balls as used in this type of product tend to float in sauce so that accurate filling of a sauce containing meat balls is not practical. Uniform filling is required so that the product in the container will be properly reflected by the ingredients statement on the label. Pasta has much different cooking requirements than, and cannot be cooked with, meat balls and/or sauce.

The use of glass as a container can be beneficial in providing a surface inert to the acid food, allow the customer to view the product and be capable of warming in a microwave oven in the original container. Many difficulties have arisen in attempting to process a pasta meat ball and sauce product as an acidified food in a glass container.

The commercial packaging of food in glass containers on mass production lines is limited by the propensity of the glass in commercial containers to shatter when subjected to thermal shock, i.e., too great a variance in temperature over too short a period of time. As an example, the manufacturer of one type of glass container specifies a standard of 21° C. (70° F.) as a thermal deviation standard to avoid shattering.

Glass containers in hot packing must be tempered, i.e. temperature adjusted slowly enough to avoid thermal shock, to avoid shattering upon packing. In a mass production line, a shattered container in addition to causing spilled material could present the danger of shards of glass falling into the openings of the numerous uncovered containers lined up for filling.

In the packing of liquid foods in glass containers, metering valves are used to fill the container with the proper amount of material in as fast a time as possible. If the food products are generally uniform in character, little difficulty ensues in rapid filling from the food metering valves in use today. These valves are designed such that, when opened, metering orifices or passageways are exposed. Foods with small, flexible particles such as pasta or small pieces of meat can be uniformly packed without serious abrasion of the food by blockage of the metering valve.

In contrast, large food particles can cause blockage of the metering valve and be subject to abrasion when passing through the orifices. Abrasion as well as blockage can lead to non-uniform filling of the container. For instance, in a tomato sauce containing meat balls, it is necessary to pack the meat balls separately in order to provide a product conforming to the ingredient declaration on the label, and to avoid organoleptic degradation of the meat balls. Also, meat balls tend to float in the sause making gravity filling a diffcult operation.

Further, food can be degraded by overcooking such as can occur in a commercial canning system as the food can be heated, during preparation, while awaiting packing as well as during pasteurization. In a product such as pasta and meat balls packed in sauce, each ingredient has its optimum cooking time and temperature. Cooking to the extent needed for one can overcook another. However, it is desirable to cook the meat balls in the container to avoid a loss of the flavor the meat can provide to the sauce.

The use of low acidity and short time heating achieves a level of commercial sterilization as effective as that obtained by retort pasteurization. Acid or acidified foods, as they are termed in the FDA regulations, provide better mouth feel and customer appeal than retorted foods by avoiding the overcooking that can accompany retort pasteurization. In order to qualify as an acid food, the food must have an equilibrium pH of 4.6 or below. This requires that the interior of solids such as meat balls and macaroni be acidified. To achieve levels of low interior acidity, the food can be blanched in food grade acid and packed in acidic liquid medium (U.S. Pat. No. 3,886,296). Meat emulsions can be acidified by the addition of encapsulated food grade acids such as citric acid encapsulated by fat in combination with an organic acid type preservative (U.S. Pat. No. 3,692,534) or an encapsulated acidogen (U.S. Pat. No. 4,262,027). Upon cooking, the encapsulation melts, releasing the acid or acidogen which hydrolyzes to an acid. The packing process must allow for the cooking of the solid products at the time of packing.

It has been found that these problems can be overcome by the present invention.

SUMMARY OF THE INVENTION

In accordance with the present invention, the problem of accurately loading solids, such as meat balls, while reducing losses due to abrasion and while controlling cooking times and temperatures for diverse components of a product can be accomplished by freezing the solids and adding the solids in frozen form to the glass container. By adding the solids frozen, the solids can be easily handled by processing equipment without loss due to abrasion. High speed packing can be accomplished while maintaining quality and guaranteeing proper compliance with labeling information. By the use of frozen solids such as uncooked meat, bacterial spoilage due to packing line breakdowns and delays in packing a specific piece of meat due to random selection of the solids in a packing machine can be avoided.

In another aspect of the invention, means are provided for the controlled cooking of food solids in glass containers while overcoming the problems of controlling conditions to avoid thermal shattering of the glass and providing proper internal pH to foods. The solids can be frozen or unfrozen and thawing can be accomplished as part of the cooking procedure. A heated gas such as air or nitrogen can be directed into the opening of the glass containers containing the solids. The air is first conducted into the container at a temperature sufficient to allow gradual heating of the glass, and thawing of the frozen solids. The temperature of the air can then be elevated further to the cooking temperature of the solids in the container allowing the solids to be cooked in the glass container without a disruptive thermal shock to the glass. If an acid food is being prepared, acid release from an encapsulated acid can occur at this point all within the container. If a fluid is then to be added to the cooked solid at a temperature sufficiently above or below the previous processing temperature to cause a disruptive thermal shock, the glass can be retempered by changing the air temperature flowing into the glass container. By the use of air, the heat transfer coefficient is sufficiently low to allow a gradual thermal change in the glass vis-a-vis liquid which has a high heat transfer coefficient. By controlling the amount of air flowing into the container, sufficient agitation can be effected to uniformly heat the solids therein.

While the invention is primarily directed at filling glass containers, the invention is adapted for packing other containers with various materials including other solid foods carried in liquids.

DETAILED DESCRIPTION OF THE INVENTION

Figure 1:
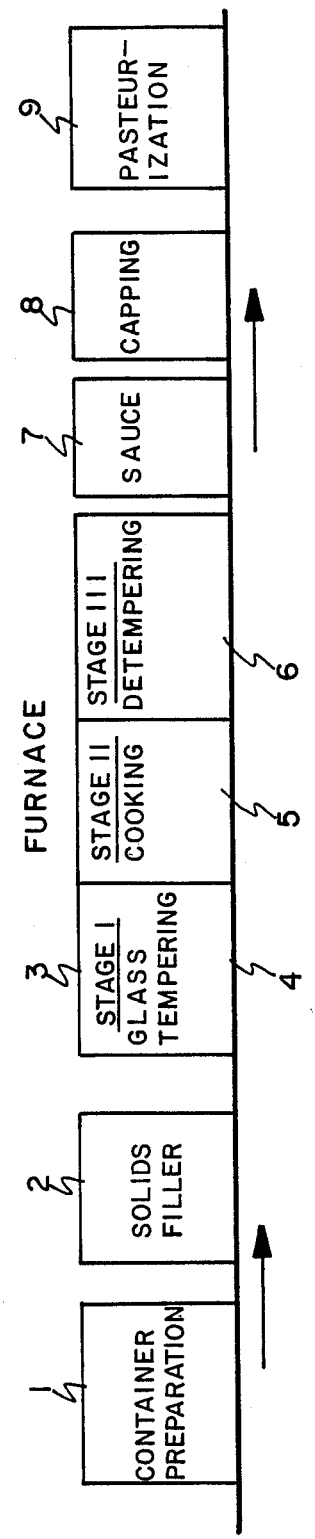
FIG. 1 is a schematic representation of the process of the invention.

As can be seen in FIG. 1, containers such as glass jars can be prepared for filling by washing, rinsing and draining according to good manufacturing techniques (1). These containers can then be filled with solid material (2). Any appropriate filling apparatus can be used. The solid material can be frozen or non-frozen. A Solburn TM apparatus which comprises a rotating series of volumetrically sized, gravimetrically filled metering cups has been found to be effective to fill and meter a fixed amount of solid into the containers. While the solids can be frozen or non-frozen, this apparatus preferably utilizes frozen solids. If the solids are frozen, they can be easily handled in this type of apparatus without packing or sticking together. The solids, when frozen, are sufficiently separated from each other to allow gravimetric feed. Appropriate temperature controlling devices can be incorporated in the filling apparatus itself and/or the apparatus can be operated under conditions such as to maintain the temperature, e.g. cold in the case of frozen solids, during filling. The remainder of the discussion will be in connection with the preferred frozen solids embodiment.

The filled containers are conveyed into tunnel furnace (3). In one embodiment of the invention, the glass in the containers is first tempered in Stage I (4) of the furnace causing partial thawing of the solid material. The temperature is then elevated in Stage II (5) of the furnace to cook the solid material in the container. Finally, the glass is retempered to a lower temperature in Stage III (6) of the furnace to avoid thermal shock shattering during the latter stages of processing. The retempered container can then be filled with a hot liquid (7), e.g., tomato sauce, capped (8) and pasteurized (9).

Figure 2:
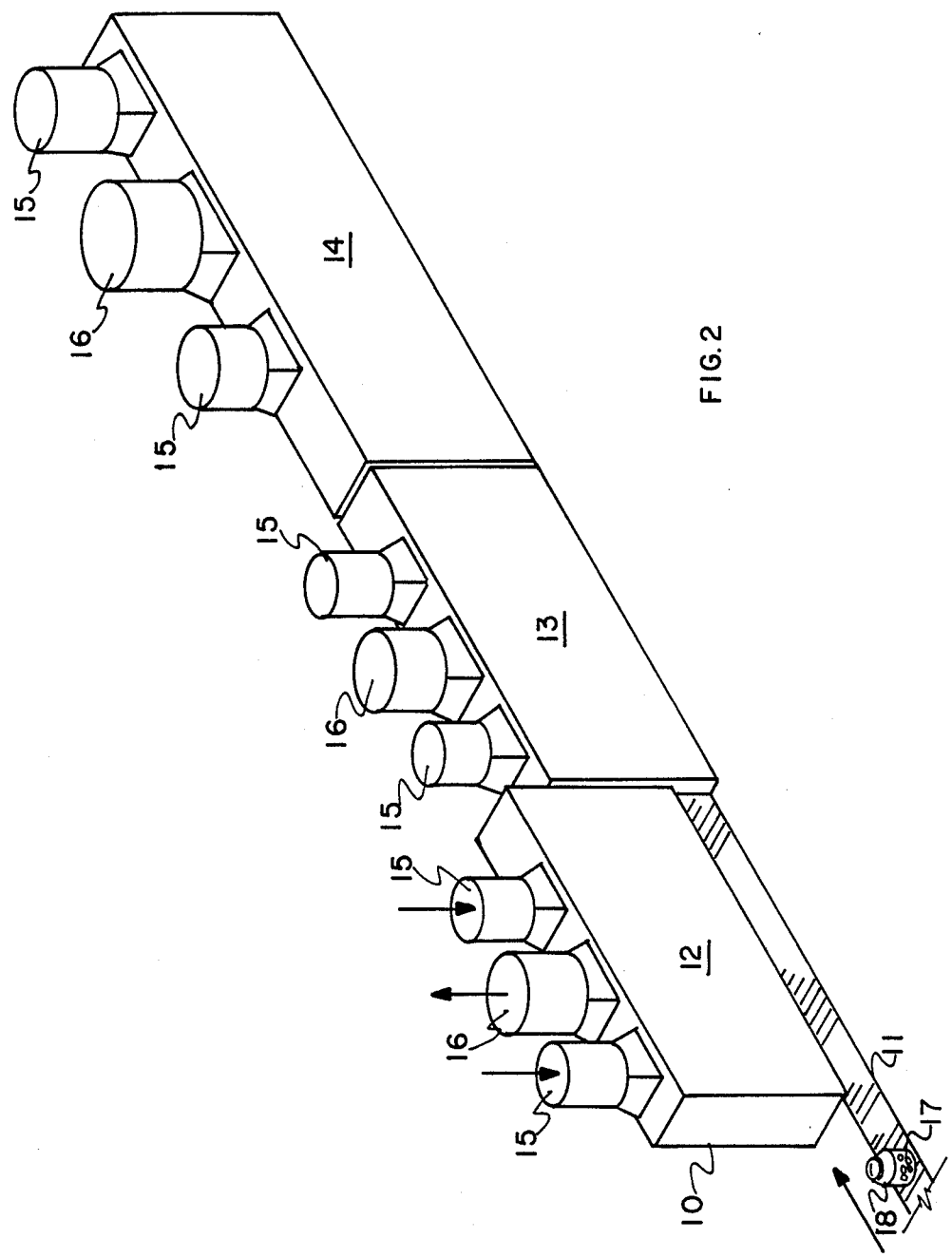
FIG. 2 is a perspective of the furnace used in the invention.

FIG. 2 is an exterior view of a heating tunnel furnace (10) which can be used in accordance with the present invention. This furnace is a tunnel-shaped forced hot air furnace having a conveyor means (11) traversing its length. Furnaces of this type are available under the trademark Wolverine. The furnace is comprised of means to direct controlled amounts of air heated at a controlled temperature over the moving conveyor means. Exhaust means are provided to control the exhaust flow of air. This type of furnace has been generally used to heat uncontainerized solids on the conveyor means with hot air impinging from the top and bottom.

In the embodiment shown in FIG. 2, the tunnel furnace is composed of three sections (12), (13) and (14), each having its separate hot air inlet means (15) and exhaust means (16). The temperature and rate of air flow in each section can easily be varied to provide differing controlled conditions throughout the length of the furnace. Furnace sections can be varied in length or number for various temperature range effects as desired to provide differing treatment times per section. The air can be heated or cooled as necessary to provide a controlled temperature effect. The tunnel is preferably continuous to avoid energy losses. The tunnel can be straight or convoluted as necessary to accommodate physical confines such as factory floor space or other equipment. Means for filling, capping and the like can be located between the furnace sections or in the furnace though this is less desirable due to energy losses. The present invention will be discussed in connection with a three stage furnace embodiment.

In the invention, solids (17) are placed in a glass container (18) and conveyed by conveyor means (11) into the furnace (10) to be heated by blasts of air. In this embodiment, the initial section of the air furnace can be elevated sufficiently to allow a container to pass into the furnace and to allow clearance for other adjacent equipment if necessary. Air flow is partially dissipated by this structure and surrounds the container more completely to initiate heating of the glass. This section of the furnace can also be on the same level as the other sections with an opening (not shown) for the containers using effective air control to achieve the desired initial glass tempering. The effective change in temperature of the glass will be gradual due to the low heat transfer coefficient of the heated air thereby avoiding thermal shock.

Figure 3:
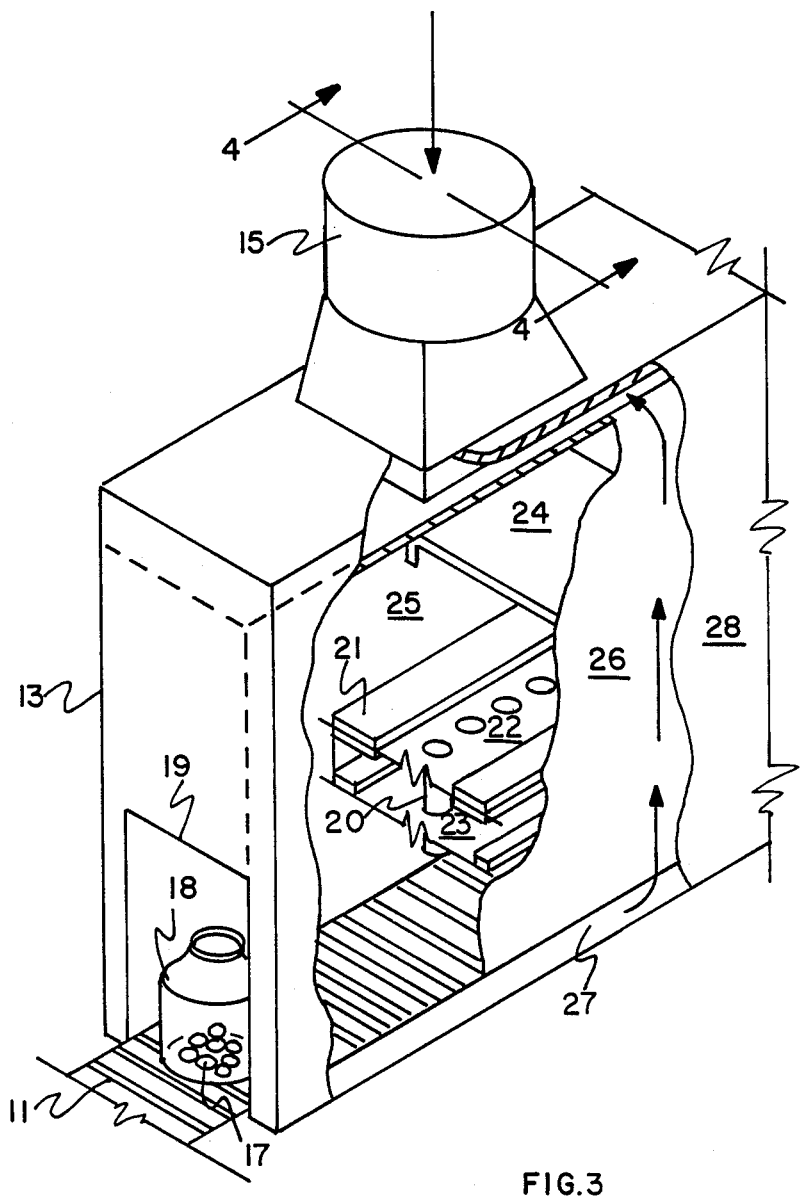
FIG. 3 is a partial section of the furnace.

Referring to FIG. 3, a container (18) containing solids (17) is conveyed into the second section (13) of tunnel furnace (10) by conveyor means (11) through opening (19). Air from air inlet (15) enters the furnace at a temperature sufficient to perform any desired function. The air can be heated by any appropriate means such as a furnace and filtered, if necessary, for impingement on food. The air can be humidified (relative humidity of 1-5% depending on temperature) to avoid drying of the food and for more efficient heat transfer. The air is confined in a plenum which terminates in a series of air ducting means positioned over the conveyor. The air is ducted into the container (18) on the conveyor means (11). The ducts are preferably comprised of small tubes (20) positioned over the line of travel of the container. The tubes are of a small diameter relative to the container opening. The tubes are preferably spaced such that air is constantly entering the container opening as the container passes through the furnace. The tubes are of such a length that a stable directable air flow can be established in the tube prior to entering the container. The ducts can also be holes in a plate or other such means. However, such means may cause undesirable turbulence and be less desirable.

In cooking food within a glass jar, it has been found essential that the tube end be in close proximity to the jar opening so that the directed air flow does not dissipate until the air has had an opportunity to contact the solids In addition, the plate to which the tube is attached is preferably in close proximity to the jar to prevent glass shards from being allowed to be blown upwardly and thus fall into an open jar. While prior examples of tunnel furnaces normally have return ducts in close proximity with the tubes, this is undesirable as this creates an upward air flow and not a downward flow to carry glass away from jar openings.

In processing food, the air must be purified as it contacts the food directly. Any passageways for the air to the food must be in accordance with food processing equipment standards. All surfaces and joints must be cleanable. For convenience of cleaning, the duct means, i.e., the tubes, are preferably secured such as by welding on both sides of the plate that carries them to avoid the formation of a gap or pocket where bacteria could harbor. To facilitate welding of the tube on two sides of a plate, the invention includes an apparatus which can properly allow for welding the tubes to the metal plate and satisfy the health requirements. A sealed box (21) can be formed having the tubes (20) welded to the top (22) and bottom (23) surfaces. For food processing, the interior of the box can be completely sealed to outside air or vented to the exhaust gas flow and all exterior joints can meet food processing equipment standards. The problem of transferring the air through ducts while meeting food processing equipment standards can thus be overcome.

In order to provide even distribution of air over the tubes, an air deflection shield (24) can be placed beneath the inlet opening (15). The shield extends for a distance sufficient to disperse the incoming air without restricting the flow thereof to the air ducts (20).

The sides (25, 26) of the inlet plenum extend to the approximate level of conveyor means (11). A negative pressure is maintained around and beneath the container by an exhaust means which controls the air flow as well as directing any glass shards down and away from any open jar. An effective exhausting means comprises a return air duct (27) formed between the outside of the inlet plenum (26) and an exterior sheathing (28). With the direct air force at the opening and a negative pressure on the exhaust at the level of the conveying means, glass shard contamination of open containers is greatly reduced or eliminated. Glass shards can be collected in a bottom trough (not shown) for disposal.

Figure 4:
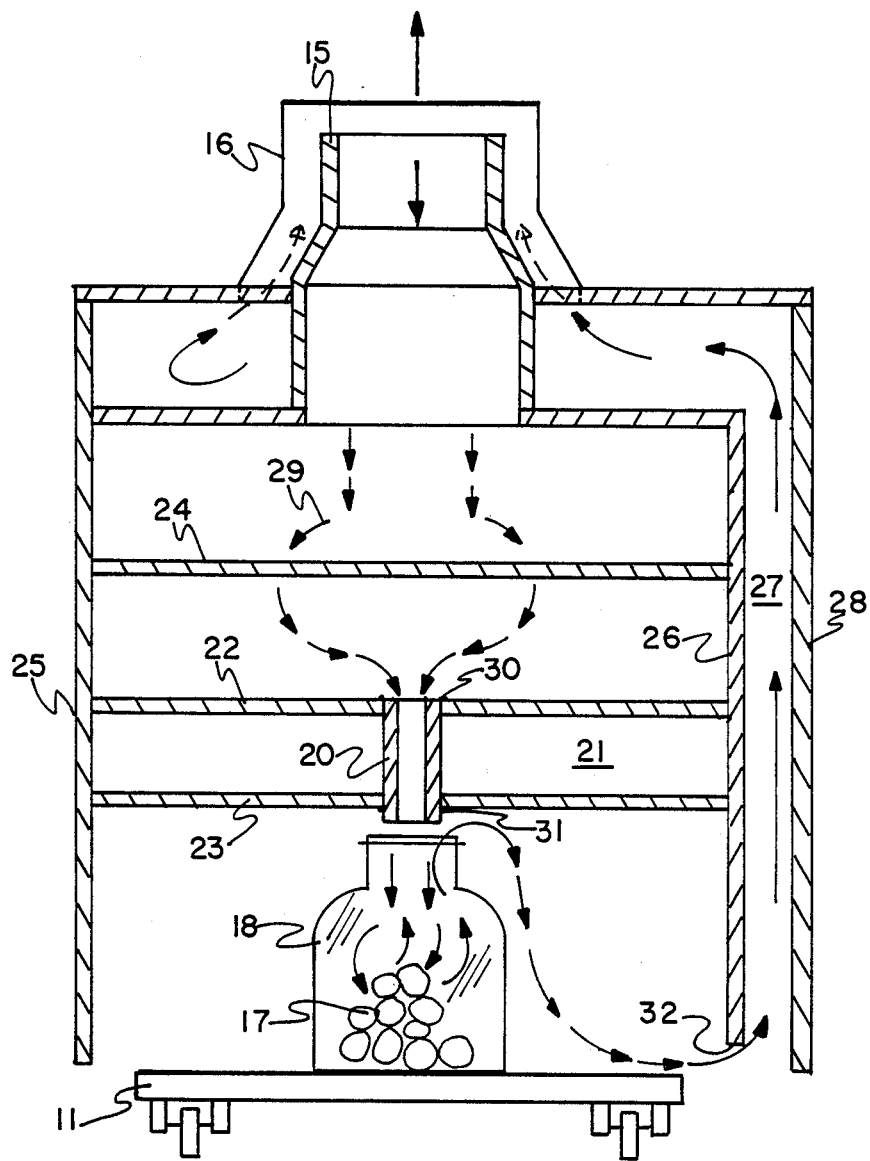
FIG. 4 is a cross-sectional view along lines 4—4 of FIG. 2 or FIG. 3 showing the internal features of the furnace.

Referring to FIG. 4, there is shown a cross-section of the tunnel furnace as adapted for the preferred embodiment of the invention. A glass container (18) containing solids (17) rests on conveyor means (11). In the preferred embodiment, the solids are uncooked or partially cooked meat balls that were deposited in container (18) in a frozen state. By "frozen state" is meant that the temperature of the solids has been reduced to a point such that the solids are substantially unabradable under normal handling and packing conditions. Air from air inlet (15) is conducted down and around shield means (24) as indicated by arrows (29) into duct means (20) which is positioned over the opening in the container (18). The duct means comprises a sealed box-like device having tubes (20) extending through the two surfaces of the box (22) and (23). Importantly, the lower surface (20) is positioned sufficiently close to the container opening to act as a deflection plate for glass shards. The tubes are secured to the surfaces of the box by welding the duct (20) to the upper surface (22) at (30) and below the second surface (23) at (31). The box (21) is sealed either by the side walls (25) of the plenum or as separate side walls for the box itself (not shown). The duct means (20) is a tube having a diameter smaller than the opening of the container (18). Preferably, the tubes are spaced apart such that air continuously flows into a container as it is moved along by the conveyor means (11). Means such as guide rails are provided (not shown) to maintain the containers in a line under the ducts.

Preferably, means are provided to convey the spent air away from the containers such as return air duct means (27). By the positive pressure on the air inlet side and the negative pressure on the air exhaust side, air is conducted down to the bottom edge (32) of the furnace and up a return air duct formed by a separate spaced covering or sheathing (28) positioned on top of the inlet plenum of the furnace terminating in exhaust means (16). While an open bottom furnace could be used if desired, the spent air is preferably conveyed away to create a more uniform inward flow of air and to avoid raising dust and other air borne materials which can contaminate the open containers as well as keeping the spent air out of the room housing the furnace. Suitable alternate means for conveying away the spent air include a trough positioned below the furnace having an exhaust blower attached thereto (not shown). The preferred method comprises forming an exhaust passageway (27) by enclosing the inlet plenum (25) with an outlet plenum (28) connected to an exhaust outlet (16). With a suitable exhaust pressure applied, the spent air will be conducted down the skirts of the inlet plenum to the bottom of the furnace (32) and out the exhaust passageway (27). The spent air can then be exhausted through outlet port (16). The exhaust gases may contain vaporized oil or other materials in addition to residual heat. By conveying the exhausted air back through a furnace means, the air can be reheated without losing the residual heat, purified by the furnace and/or filters and returned as part of the inlet air.

In a preferred embodiment, the invention is used to uniformly package meat balls in a tomato sauce with or without pasta under the acidified food processing regulations. Citric acid encapsulated in fat can be incorporated into the meat. Upon cooking, the acid is released to provide the necessary internal pH of below 4.5.

Meat balls of up to about 1.3 centimeters (0.5 inch) average diameter are prepared having encapsulated citric acid blended therein. The meat balls are formed in any appropriate manner, such as by using commercial equipment so adapted. The meat balls are frozen in an uncooked state.

An appropriate number of meat balls is filled into a glass container, e.g. 6 meat balls in a 450 milliliter (15 oz.) jar, that has been prepared for acceptance of food according to good manufacturing practices. This separate addition of frozen meat balls allows for accurate filling of the meat balls into the containers at high speed and avoids abrasion to the meat balls which would degrade their appearance and could effect the quantity of meat added.

The container packed with the meat balls is placed on a conveyor and passed into the tunnel furnace. Air passed into the container at a rate sufficient to reach the bottom of the jar for complete heating though lesser or greater quantities can be used if desired. The air flow is preferably controlled at a level sufficient to maintain the meat balls in fluid motion for even heating. By properly controlling the air flow, the meat balls can be uniformly treated with the air. The heated air in the first section not only heats the glass but partially thaws the meat balls for cooking in the second section of the furnace. The container is passed through the first section of the furnace for a period of time sufficient to elevate the temperature of the glass to within about 21° C. (70° F.) of the temperature used in the second stage to avoid thermal shock.

The container is then conveyed to the second stage where the temperature of the air is increased to a cooking temperature for the meat such as within the range of from about 121° C.–149° C. (250° –300° F.). By the use of separate heating zones, the glass can be separately tempered and cooking temperature need only be applied for a short time to conserve energy. The meat balls are contacted with the heated air for a period of time and at a temperature sufficient to denature the protein and elevate the center temperature of the meat balls above the melting point of the fat-encapsulated acid. Air is preferably continuously applied into the opening of the moving containers by proper placement of correctly sized air ducts relative to the size of the container opening. The meat balls are kept under constant agitation during cooking by the flow of the air. Since the cooking is accomplished in the container, the cooking time can be controlled without overcooking and loss of meat juices that are beneficial for flavor. Non-continuous application of air may be less efficient in that gaps in the heating can increase the cooking time.

The glass temperature can then be retempered to avoid thermal shock shattering of the glass upon addition of the sauce. Glass tempering is important at this stage since heat transfer from a liquid is more efficient than from a gas so that temperature change in the glass will be more rapid. Since temperatures more conducive to the cooking of the sauce i.e., 82.8°–93.3° C. (190°–200° F.), are lower than that used to cook the meat, the glass is retempered in the third stage of the furnace, by passing a cooler air into the glass container. While mere dissipation of heat by standing can reduce the temperature, the degree of temperature reduction and the time involved cannot be controlled. By the use of a controlled air flow, the temperature of the glass can be accurately controlled in a set period of time. This is essential in a fast moving packing line. The container remains in third section for a period of time and under air of a temperature sufficient to provide a glass temperature of within the thermal shock limits, e.g., ±21° C. (70° F.), of the sauce to be added. This step is optional should the glass not require retempering.

While it is preferred to apply the heating solely by means of the inlet air, external heating sources can also be used. For example, radiant heating can be used on the exterior of the container to provide a heated environment for the container being heated by the air. Heated air can also be directed around the container though the preferred embodiment uses a downward air flow to control glass fragmentation. While conventional heating is desired to brown the meat, the meat can be solely or partially heated or cooked with microwaves. Since glass is an appropriate container for microwave cooking, a microwave device can be included as a separate step or built into the furnace itself. A combination of heated air and microwave heating can also be used.

After the furnace, the container leaves the furnace and is conveyed to the sauce filler e.g., tomato sauce. Optionally, other steps can be performed on the container and its contents in the furnace if desired.

The sauce is prepared in accordance with good manufacturing procedures. Pasta, prepared separately, can be blended with the sauce for filling into the containers.

The container from the furnace is filled with sauce using standard filling equipment. The containers are then capped under vacuum, and pasteurized by heating for a sufficient time and at a sufficient temperature to effect that end. The products can then be labeled and packaged for shipment.

The above process can be used to process any solid material whether food or non-food in a type of container but especially a glass container where the problems of uniformly filling separate substances arises. The solidification of a normally soft abradable material allows for its easy handling. The thermal furnace allows for easy and uniform thawing and, if necessary, treatment of the material after it is in the container. Further processing can then be undertaken such as adding a liquid to the container. While the invention is especially useful for glass containers, other containers such as metal and heat resistant plastic can be packed in the same facilities to achieve the same beneficial results.

What is claimed is:

1. An apparatus for heat treating material comprising a tunnel furnace, conveyor means extending axially the length of the furnace for conveying the material to be heat treated along the length of the tunnel, container means having a closeable top opening for carrying the material to be heat treated on the conveyor means, a plurality of gas duct means arranged axially along the conveyor means and positioned above the closeable top opening of the container means, the cross-section area of said gas duct means being smaller than the cross-section area of the closeable top opening of the container means, and means for providing a flow of controlled temperature gas through said duct means whereby the flow of controlled temperature gas is directed into the closeable top opening of the container means to heat treat the material contained therein.

2. The apparatus as recited in claim 1 wherein the container means is a glass jar.

3. The apparatus as recited in claim 1 wherein the material to be treated is food.

4. The apparatus as recited in claim 1 wherein the duct means are tubes positioned such that the interior of the container means is always under direct downward flow of controlled temperature gas as the container means passes through the furnace.

5. The apparatus as recited in claim 2 which further includes a deflector plate positioned sufficiently above and near the opening of the container so as to effectively deflect shards of glass formed upon breakage of another container away from the opening.

6. The apparatus as recited in claim 5 wherein the deflector plate is the lower surface of a rectangular box-like device for holding said duct means.

* * * * *